United States Patent [19]

Holliday

[11] Patent Number: 5,129,559
[45] Date of Patent: Jul. 14, 1992

[54] VEHICLE CARRIER BRACKET

[76] Inventor: William B. Holliday, 1913 Norwich Dr., Greensboro, N.C. 27410

[21] Appl. No.: 675,858

[22] Filed: Mar. 27, 1991

Related U.S. Application Data

[63] Continuation of Ser. No. 446,854, Dec. 6, 1989, abandoned.

[51] Int. Cl.$^5$ ............................................ B60R 9/00
[52] U.S. Cl. ........................ 224/42.03 B; 224/42.03 R; 224/42.45 R
[58] Field of Search .................. 224/42.03 B, 42.07, 224/42.08, 42.43, 42.44, 42.03 R, 42.45 R

[56] References Cited

U.S. PATENT DOCUMENTS

| | | | |
|---|---|---|---|
| 3,225,986 | 12/1965 | Anderson | 224/42.03 B |
| 3,240,406 | 3/1966 | Logan | 224/42.03 B |
| 3,891,132 | 6/1975 | Chandler | 224/42.03 B |
| 4,213,729 | 7/1980 | Cowles et al. | 224/42.03 B |
| 4,461,410 | 7/1984 | Tartaglia | 224/42.03 B |
| 4,823,997 | 4/1989 | Krieger | 224/42.03 B |

*Primary Examiner*—Linda J. Sholl

[57] ABSTRACT

A vehicle carrier bracket is formed from tubular steel and is releasably mounted to the rear trailer hitch of a vehicle for exterior transportation of bicycles, wheelchairs or the like. The carrier bracket provides for easy loading and unloading of the cargo and for safe and secure transportation. The bracket is easily assembled and mounted on the trailer hitch, and later can be quickly disassembled and removed therefrom when not in use.

13 Claims, 3 Drawing Sheets

VEHICLE CARRIER BRACKET

This is a continuation of application Ser. No. 07/446,854 filed Dec. 6, 1989, which is now abandoned.

BACKGROUND OF THE INVENTION

1. Field Of The Invention

The invention herein pertains to exterior racks or brackets which are used by automobile and other vehicle owners for carrying bicycles, wheelchairs and other similar cargo. The bracket is temporarily affixed to the exterior of the vehicle for ease and convenience in transporting a wheelchair or the like without occupying interior passenger space.

2. Description Of The Prior Art And Objectives Of The Invention

For many years vehicle owners have transported bicycles and wheelchairs in vehicle trunks and in the rear seats of automobiles, vans and other vehicles out of necessity and thereby have encountered a great deal of inconvenience in so doing. Bicycles and wheelchairs can be extremely unmanagable while attempting to place them in the back seat of an automobile and are oftentimes too heavy for many persons to lift them up and over into a vehicle trunk compartment. Through the years various racks have been constructed for transporting such cargo exteriorly on top, in front and at the rear of cars, trucks and vans, all with varying degrees of convenience and success. Many such conventional brackets or carriers are difficult to properly secure to the vehicle and others, although securely attached, are difficult to use, as oftentimes the cargo has to be lifted several feet off the ground, requiring two or more persons to place a conventional bicycle or wheelchair thereon. In addition, persons who must carry a wheelchair on one occasion and a bicycle on another have had to remove one carrier from the vehicle and mount a second carrier in its place, depending on the particular cargo to be transported at that time.

Thus with the difficulties and disadvantages associated with conventional vehicle carrier brackets, the present invention was conceived and one of its objectives is to provide a carrier bracket for mounting on a vehicle which can be used to carry either a bicycle or wheelchair without removal from the vehicle.

It is still another objective of the invention to provide a vehicle carrier bracket which is rigidly fastened to the vehicle and upon which a bicycle or the like can be conveniently lifted, mounted and removed by one person.

It is another objective of the invention to provide a vehicle carrier bracket which is affixed to a conventional vehicle trailer hitch and which can be modified to carry either a bicycle or a wheelchair as desired by the user.

It is also an objective of the invention to provide a vehicle carrier bracket which is relatively low in cost and which can be easily assembled, mounted on a vehicle hitch, modified for bicycles or wheelchairs, disassembled and removed as required from the vehicle hitch by relatively unskilled personnel.

It is still another objective of the invention to provide a vehicle carrier which will readily secure and maintain a bicycle or wheelchair while being transported over rough roads or terrain.

Various other advantages and objectives will be realized by those skilled in the art as a more detailed presentation of the invention is presented below.

SUMMARY OF THE INVENTION

The present invention provides a vehicle carrier bracket for mounting on a rear trailer hitch of a vehicle for transporting bicycles or wheelchairs thereon. The bracket is secured by a threaded stud which passes through a conventional rear trailer hitch opening where it is held by a nut and the bracket includes a longitudinal member which is parallel with the rear vehicle bumper. A vertical member is attached thereto in substantially perpendicular fashion forming an inverted "T", and a pair of cargo supports are mounted on each end of the longitudinal member. The cargo supports are in the form of arcuately shaped wheel receptacles for bicycle transportation and for wheelchair carrying, the cargo supports take the form of an L-shaped and Z-shaped member which are also releasably affixed to the longitudinal member. One or more resilient straps can be affixed to the upper end of the vertical member for surrounding the cargo to hold it securely in place during transportation.

DESCRIPTION OF THE PREFERRED EMBODIMENT

Figure 2:
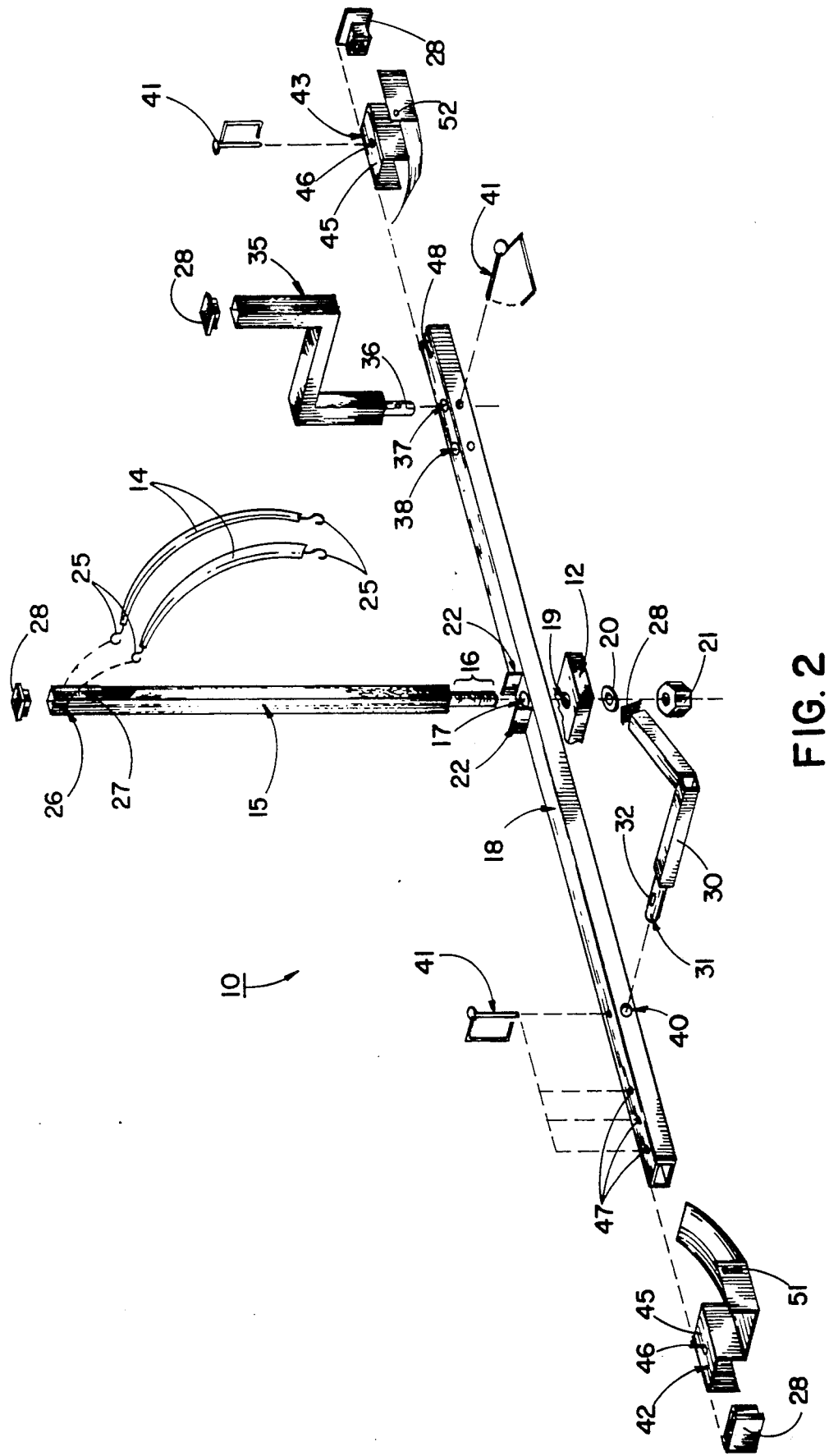
FIG. 2 demonstrates the vehicle carrier bracket in exploded fashion.

The preferred form of the invention is shown exploded in FIG. 2 whereby an inverted T-shaped carrier bracket is made from rectangular tubular steel which is conventionally coated to prevent rust and corrosion. The vertical member may be approximately twenty-eight inches in length and is rigidly affixed to a threaded stud at its bottom end. The threaded stud passes through an opening in the longitudinal member and on through a conventional trailer hitch opening where it is secured by a washer and nut thereunder. Thus, the vertical and longitudinal members are tightly affixed to a conventional trailer hitch so as to be later conveniently removable as required. The vertical member is affixed in perpendicular fashion to the longitudinal member which includes a resilient pad on the front side along the upper end thereof to prevent scarring of a wheelchair or bicycle which may be carried. The upper end of the vertical member defines a plurality of openings for attaching resilient rubber strap hooks therein which are used to temporarily hold bicycle cargo or the like. Also seen in FIG. 2 means are provided on each end of the longitudinal member for supporting bicycle wheels or a wheelchair. In the event a bicycle is to be carried, arcuately shaped wheel receptacles are releasably attached by standard locking pin clips to the longitudinal member and at least one of the wheel receptacles can be adjustably positioned along the longitudinal member so as to accommodate various size bicycle frames. If on the other hand, a wheelchair is to be transported, a pair of supports, one having a substantially L-shaped configuration and the other having a substantially Z-shaped configuration are affixed on either side of the longitudinal member, on opposite sides of the vertical member, for carrying a wheelchair. The L-shaped and Z-shaped supports are releasably affixed to the longitudinal member also by locking pin clips which can be easily removed as required. Thus, once the vertical and longitudinal members are affixed to the trailer hitch, bicycle and/or wheelchair supports can be positioned therealong, depending on the particular cargo to be transported. In the event a user may want to switch from transporting a bicycle to a wheelchair, the supports can be quickly changed or removed if needed in a matter of minutes.

DETAILED DESCRIPTION OF THE DRAWINGS AND OPERATION OF THE INVENTION

Figure 1:
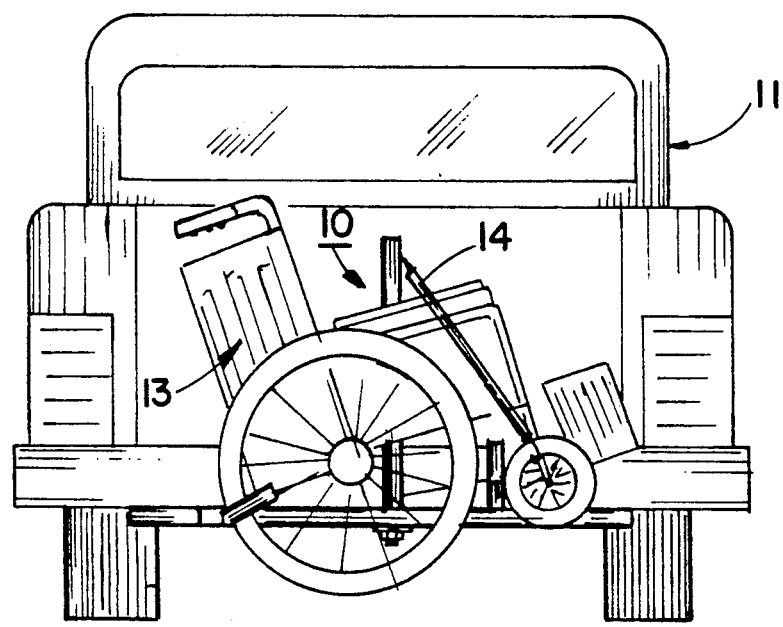
FIG. 1 illustrates a conventional automobile having the vehicle carrier bracket of the invention affixed to a rear trailer hitch.

Turning now to the drawings. FIG. 1 illustrates carrier bracket 10 attached to the rear of automobile 11 by securing it to trailer hitch 12 (shown in partial fashion in FIG. 2). Wheelchair 13 is first collapsed and it is then easily lifted onto carrier bracket 10 and secured by resilient strap 14. As illustrated in FIG. 2 in greater detail, carrier bracket 10 includes vertical member 15 formed from tubular steel and provided with threaded stud 16 at the bottom thereof. Threaded stud 16 passes through center stud channel 17 of longitudinal member 18 and through trailer hitch opening 19 of trailer hitch 12 which is joined to the frame of automobile 11 as is standard in the industry. Threaded stud 16 is then secured to trailer hitch 12 by washer 20 and nut 21. Carrier bracket 10 is easily assembled and disassembled as required by the user and vertical member 15, after assembly and during use remains in stable, perpendicular alignment with longitudinal member 18. Stabilizer flanges 22 are rigidly attached to top surface 60 by welding or the like to form an integral structure with longitudinal member 18 and provide additional support to vertical member 15.

Resilient rubber straps 14 have metal hooks 25 at each end thereof and upper hooks 25 are fittable within openings 26 at the top end of vertical member 15. One or more straps 14 can be used depending on the particular cargo to be transported and as shown in FIG. 1, one such strap is used to hold wheelchair 13 in place, wherein FIG. 4, two straps 14 are employed to secure bicycle 50. Resilient pad 27 is positioned by an adhesive on vertical member 15 along the top portion thereof and may consists of a fabric, rubber or synthetic materials which will prevent scarring of the bicycle or wheelchair frame which is being transported. Plastic end caps 28 are inserted into the ends of the tubular steel members for providing a smooth, finished end thereto and may be formed from an inexpensive plastic, wood or other suitable materials.

Figure 3:
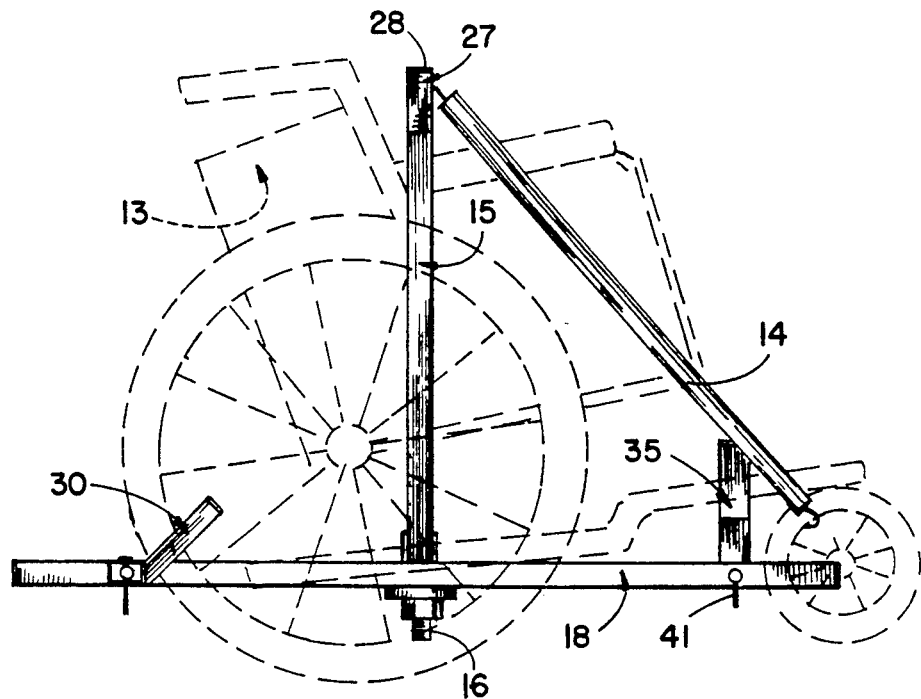
FIG. 3 shows an elevational view of the carrier bracket with a ghost wheelchair mounted therein.

Once bracket 10 is affixed to trailer hitch 12 as seen in FIG. 2, the user can select a particular means to support cargo on said bracket, depending on the type of cargo to be transported. For example in FIG. 3, for transportation of wheelchair 13, L-shaped support 30 having a cylindrical stud 31 (FIG. 2) is positioned through opening 40 and is releasably secured therein by locking pin clip 41 which passes first through the opening in longitudinal member 18 and then through opening 32 in stud 31. At the opposite end of longitudinal member 18, Z-shaped support 35 having cylindrical stud 36 affixed thereto is similarly mounted on longitudinal member 18 as stud 36 passes through opening 37 and releasable clip 41 secures Z-shaped support 35 thereon. An auxiliary opening 38 is also provided on longitudinal member 18 for use with Z-shaped bracket 35 for a smaller model wheelchair.

In the event a bicycle is to be transported in place of a wheelchair, arcuate shaped wheel receptacles 42 and 43 are utilized. As would be understood, wheel receptacles 42 and 43 include a sleeve portion 45 which slides over longitudinal member 18 and, receptacle 42 is adjustably positioned therealong by the alignment of opening 46 with openings 47 in longitudinal member 18. As would be understood, openings 47 have corresponding openings along the bottom of tubular longitudinal member 18 which are not shown in FIG. 2. In the embodiment as shown in FIG. 2, only wheel receptacle 42 is adjustable along longitudinal member 18 whereas wheel receptacle 43 is positionable only at opening 48. However, additional openings could be provided adjacent opening 48 along the right side of longitudinal member 18 as shown in FIG. 2 as desired for greater adjustability.

Figure 4:
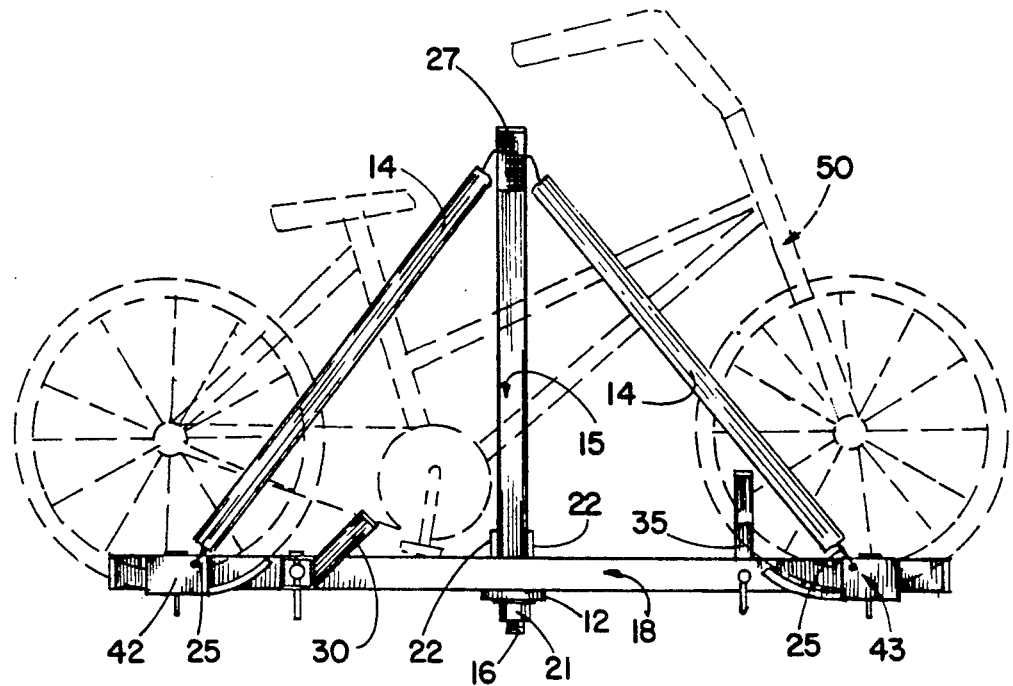
FIG. 4 pictures the carrier bracket with a ghost bicycle secured therein and with the wheelchair supports in place but out of contact with the cargo.

Openings 51 and 52 are shown respectively in arcuate wheel receptacles 42, 43 for attachment of bottom strap hooks 25 as seen in FIG. 4. Carrier bracket 10 as discussed above can thereby be conveniently used without concern for maintaining the cargo selected in an exterior, secure mode during transportation. By the selection of the required supports (30, 35, 42, 43) which are releasably affixed to longitudinal member 18, either a wheelchair or bicycle can be carried and said supports can be exchanged or in some cases remain in place while additional supports are utilized such as seen in FIG. 4 whereby bicycle 50 is carried utilizing wheel receptacles 42 and 43 although wheelchair supports 30 and 35 remain affixed, yet out of the way of bicycle 50.

The illustrations and examples provided herein are for explanatory purposes and are not intended to limit the scope of the appended claims.

I claim:

1. A carrier basket for attachment to the exterior of a vehicle for selective transporting of cargo thereon comprising: a rectangular, tubular longitudinal member, a vertical member, said vertical member defining a strap receiving opening, said vertical member affixed in substantially perpendicular alignment to said longitudinal member, said longitudinal member comprising a top surface, a vertical stabilizing flange, said flange integrally formed with said top surface of said longitudinal member, said flange for contacting said vertical member to maintain said vertical member upright, a pair of longitudinal member end caps, said end caps for insertion into the ends of said longitudinal member, a resilient cargo strap, said strap for engaging said cargo and for attachment to said vertical member through said strap receiving opening, means to support cargo on said bracket, said support means comprising a pair of exchangeable cargo supports, said cargo supports releasably attached to said longitudinal member whereby said cargo supports can be selected and attached to said longitudinal member for maintaining either a wheelchair or a bicycle on said carrier bracket with said resilient strap.

2. A carrier bracket as claimed in claim 1 wherein each of said pair of supports are positioned on opposite ends of said longitudinal member.

3. A carrier bracket as claimed in claim 2 wherein said vertical member comprises a threaded stud, a tubular member, said stud joined at one end of said tubular member, said longitudinal member defining a stud opening, said stud for positioning through said stud opening for securement of said vertical and longitudinal members together.

4. A carrier as claimed in claim 1 wherein one of said cargo supports comprises an arcuate wheel receptacle.

5. A carrier bracket as claimed in claim 2 wherein one of said cargo supports is L-shaped, said L-shaped cargo support comprising a cylindrical stud, said stud for attachment to said longitudinal member.

6. A carrier bracket as claimed in claim 2 wherein one of said cargo supports is substantially Z-shaped, said Z-shaped support comprising a cylindrical stud, said stud for attachment to said longitudinal member.

7. A carrier bracket as claimed in claim 1 and including a locking pin clip, said clip for releasably attaching one of said cargo supports to said cylindrical member.

8. An inverted T-shaped cargo carrier basket for attachment to a vehicle trailer hitch for selective transportation of cargo thereon comprising: a rectangular, tubular longitudinal member, said longitudinal member comprising a top surface, a pair of longitudinal member end caps, said longitudinal end caps for insertion into the ends of said longitudinal member, a vertical member, said vertical member defining a strap receiving opening, said vertical member comprising a square tube, a vertical end cap, said end cap for insertion into said vertical member, a resilient pad, said pad affixed to said vertical member, a threaded stud, said stud affixed to the bottom of said vertical member, said longitudinal member defining a stud channel, said stud positionable through said stud channel for attachment to said trailer hitch to secure said longitudinal and vertical members thereto, a pair of vertical stabilizing flanges, said flanges integrally formed with said top surface of said longitudinal member on opposite sides of said stud channel, said stabilizing flanges on contact and support said square vertical tube when said vertical tube is mounted on said longitudinal member to prevent rotation thereof, means to support cargo on said bracket, said cargo support means comprising a pair of exchangeable cargo supports releasably mounted on said longitudinal member and a resilient cargo strap, said strap attached through said opening in said vertical member whereby said cargo supports can be selected and releasably attached to said longitudinal member for maintaining either a wheelchair or a bicycle on said carrier bracket with said resilient strap.

9. A cargo carrier bracket as claimed in claim 8 wherein said cargo support means comprises a pair of arcuate wheel receptacles.

10. A cargo carrier bracket as claimed in claim 8 wherein said cargo support means comprises one L-shaped member and one Z-shaped member.

11. A cargo carrier bracket as claimed in claim 8 wherein said cargo support means includes one pair of arcuate wheel receptacles, one L-shaped member and one Z-shaped member.

12. A cargo carrier bracket as claimed in claim 8 wherein said cargo support means is adjustably positioned on said longitudinal member.

13. A cargo carrier bracket as claimed in claim 8 and including a resilient pad, said pad affixed to said vertical member.

* * * * *